United States Patent [19]
Takeuchi et al.

[11] Patent Number: 6,006,209
[45] Date of Patent: Dec. 21, 1999

[54] AUTOMATIC CASH TRANSACTION APPARATUS

[75] Inventors: Ikuo Takeuchi, Ibaraki-ken; Masao Okayama, Ryugasaki, both of Japan

[73] Assignee: Hitachi, Ltd., Tokyo, Japan

[21] Appl. No.: 08/934,065

[22] Filed: Sep. 19, 1997

[30] Foreign Application Priority Data

Sep. 20, 1996 [JP] Japan ................................... 8-249759

[51] Int. Cl.$^6$ ....................................................... G06F 7/00
[52] U.S. Cl. ........................... 705/40; 235/375; 235/379; 235/381; 235/474; 235/475; 235/476; 382/135
[58] Field of Search ........................... 705/40, 43; 902/7, 902/8, 9, 11, 12, 13, 14, 15, 16, 17, 38; 702/128, 129; 235/375, 379, 381, 474, 475, 476; 382/135

[56] References Cited

U.S. PATENT DOCUMENTS

| | | | |
|---|---|---|---|
| 4,462,587 | 7/1984 | Greaf et al. ................................. | 902/16 |
| 4,487,306 | 12/1984 | Nao et al. .................................. | 902/11 |
| 4,556,140 | 12/1985 | Okada ......................................... | 902/7 |
| 4,587,434 | 5/1986 | Roes et al. .................................. | 902/7 |
| 4,625,870 | 12/1986 | Nao et al. ................................... | 902/12 |
| 4,889,240 | 12/1989 | Sato et al. ................................. | 209/534 |
| 4,972,958 | 11/1990 | Ito et al. .................................... | 902/12 |
| 5,478,992 | 12/1995 | Hamada er al. ........................... | 902/11 |

Primary Examiner—James P. Trammell
Assistant Examiner—Mussie Tesfamariam
Attorney, Agent, or Firm—Antonelli, Terry, Stout & Kraus, LLP

[57] ABSTRACT

An automatic cash transaction apparatus includes a deposit/payment port for depositing/paying bills; a circulatable bill storage unit for storing therein circulatable bills used to be paid among the deposited bills: an uncirculatable bill storage unit for storing therein uncirculatable bills not used to be paid; a convey path for conveying bills among the deposit/payment port, the circulatable bill storage unit, and the uncirculatable bill storage unit; a feature extracting means provided on the convey path, for extracting a pictorial pattern for the respective bills deposited via the deposit/payment port; and a memory means for storing therein the features extracted by the feature extracting means with respect to each of the deposited bills.

20 Claims, 5 Drawing Sheets

THICKNESS

AUTOMATIC CASH TRANSACTION APPARATUS

BACKGROUND OF THE INVENTION

The present invention relates to an automatic cash transaction apparatus used in a financial institution. More specifically, the present invention is directed to an automatic cash transaction apparatus capable of suitably handling bills.

In one conventional automatic cash transaction apparatus, bills deposited by a customer via a deposit port are separated one by one and the separated bills are discriminated. When the bills could not be judged as the genuine bills, or the normal bills during the discriminating process. Then, these bills are recognized as the abnormal bills, and these abnormal bills are conveyed to a payment port. To the contrary, when the bills could be recognized as the normal bills, all of these normal bills are temporarily stored into a stacker having a similar structure to that of a storage unit. As to bills, there are bills useable for a payment (namely, circulatable bills), and bills not useable for a payment (namely, uncirculatable bills). When the customer confirms a total amount of his deposited bills, the bills stored in the temporary stacker are again separated one by one, and the circulatable bills are stored in a circulatable bill storage unit whereas the uncirculatable bills are stored into an uncirculatable bill storage unit. When the customer cancels the deposit transaction, the bills stored in the temporary stacker are again separated one by one in a similar manner when the customer makes a confirmation. Then, the separated bills are returned to the payment port.

At this time, as in such an automatic cash transaction apparatus described in U.S. Pat. No. 5,478,992, in order that the bills stored in this transaction apparatus are correctly managed one by one, the characters or the symbols indicative of the features about all of the bills acquired into the transaction apparatus are read out. Then only the readable bills are stored into this transaction apparatus, and then the read information thereof is stored in the storing order.

During the payment, the bills are separated one by one from the circulatable bill storage unit, and then the separated circulatable bills are fed out therefrom so as to be discriminated. During the discriminating process operation, if each of these circulatable bills may own the feature defined as one sheet of bill, then this circulatable bill can be judged as the normal bill. The normal bill can be conveyed to the deposit/payment port for payment purposes. When the bill is judged as the abnormal bill, for example, such a bill whose sensor signal for extracting a feature of this bill represents an abnormal value, and such bills which are mistakenly conveyed in multiple mode, in shift manner, and in skew manner, this abnormal bill is not used for the payment, but is directly stored into a specific storage unit. After this cash transaction apparatus is turned OFF, a staff member confirms the total number and the amount sort of these abnormal bills stored in the storage unit.

As the uncirculatable bills, there are bills having heavy damage conditions, bills of certain amounts which are not originally used for payments, and foreign bills.

In the above-explained conventional automatic cash transaction apparatus, since the discriminated bills are stored into the temporary stacker without being separated into the circulatable bills and the uncirculatable bills, when these bills are conveyed from the temporary stacker to the deposit/payment port, or to the storage units, these conveyed bills must be again separated. However, during this reseparation operation, the following problem will occur. That is, the heavy damaged bills are bent, broken, or cut away. Otherwise, since the size of the temporary stacker is designed to be fitted to the largest-sized bill, the small-sized bills may cause skew problems, shift problems, and therefore paper jam problems.

Also, in the case that the above-described paper jam occurs, the customer cancels the transaction, or the customer has such a complaint that a total number/amount sorts of his deposited bills are not made coincident with those of the bills returned to the payment port, since only the characters and symbols of these bills are stored in the conventional automatic cash transaction apparatus, there is another problem that the customer could not receive satisfactory trouble reasoning from the staff members of the financial institution where this conventional automatic cash transaction apparatus is installed.

Furthermore, when the abnormal bills occur during payment, since the total number of the bills presently stored int the storage unit could not be grasped, there is a further problem that the automatic cash transaction apparatus should be interrupted while a certain limitation number is decided for the total number of bills stored in the storage unit.

SUMMARY OF THE INVENTION

The present invention has been made to solve the above-described problems, and therefore, has a primary object to provide an automatic cash transaction apparatus capable of readily solving such problems that deposited bills are jammed, and/or there is a difference between a total amount of deposited bills and a total amount of returned bills.

A secondary object of the present invention is to provide an automatic cash transaction apparatus having such a structure capable of preventing a paper jam caused by uncirculatable bills.

A thirdly object of the present invention is to provide an automatic cash transaction apparatus capable of correctly managing an amount of cash stored therein, and of effectively utilizing bills stored therein.

To achieve the above-described objects, according to an aspects of the present invention, in an automatic cash transaction including a deposit/payment port of depositing/paying bills; a circulatable bill storage unit for storing therein circulatable bills used to be paid among the deposited bills; an uncirculatable bill storage unit for storing therein uncirculatable bills not used to be paid; and a convey path for conveying bills among the deposit/payment port, the circulatable bill storage unit, and the uncirculatable bill storage unit;

the automatic cash transaction apparatus is comprised of:
  feature extracting unit provided on the convey path, for extracting a pictorial pattern of the respective bills deposited via the deposit/payment port; and
  memory unit for storing therein the features extracted by the feature extracting unit with respect to each of the deposited bills.

DESCRIPTION OF THE PREFERRED EMBODIMENTS

Referring now to drawings, automatic cash transaction apparatus according to embodiments of the present invention will be described.

Figure 1:
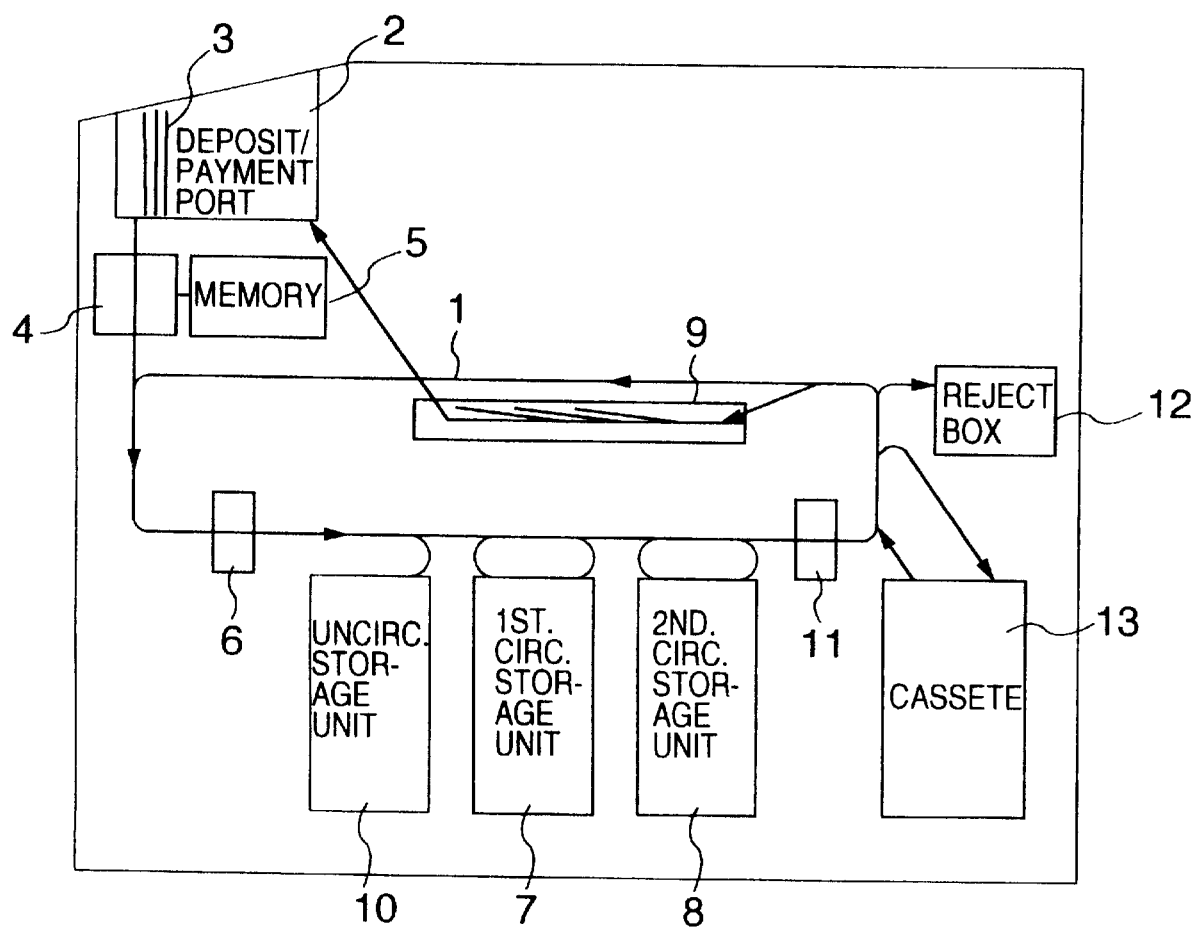
FIG. 1 is a schematic diagram showing a bill convey mechanism of an automatic cash transaction apparatus according to an embodiment of the present invention.

FIG. 1 schematically indicates an arrangement of a bill convey mechanism of an automatic cash transaction apparatus according to an embodiment of the present invention. In this bill convey mechanism of FIG. 1, bills are conveyed on a convey path 1 constructed of a convey belt along the arrow direction.

A deposit/payment port 2 separates deposited bills 3 and then the separated bill 3 are fed to the convey path 1. A feature extracting unit 4 is constituted by an image acquiring apparatus for acquiring a feature appearing in an image such as a pictorial pattern and a bill number with respect to each of the bills conveyed on the convey path 1. A memory unit 5 stores therein the images extracted by the feature extracting unit 4 with respect to each of the bills. The memory unit 5 is connected to a display apparatus (not shown), by which the storage contents may be displayed.

In this embodiment, in addition, the feature extracting unit 4 may preferably extract a physical feature of a bill such as a thickness and a size (dimension) of a bill. In particular, in order to properly solve customer's complaints, these image feature and physical feature may be stored in combination with image information (will be discussed later).

It should be noted that as apparent from the foregoing descriptions, it is preferable to store the information about all of the deposited bills in the memory unit 5. Alternatively, when there is limitation in the memory capacity of the memory unit 5, information stored in this memory unit 5 may be acquired only from the following bills, namely, only bills (will be referred to "circulatable bill" hereinafter) which can be judged as genuine bill (will be referred to "normal bill" hereinafter) by first discriminating unit 6 and thus can be used for payments; only bills (will be called as "uncirculatable bill" hereinafter) which are not used for payments, only bills (will be referred to "abnormal bill" hereinafter) which cannot be judged as normal bills; or a combination of these bills. This is because a paper jam problem is mainly caused by such "uncirculatable bill" and "abnormal bill". In view of such the fact that customers make their complaints about quantities and sorts of bills, only the circulatable bills are stored once into a storage unit. Under such a circumstance, the information about all of these bills need not be stored in the memory unit 5.

Also, the visible information such as the pictorial patterns and bill number is extracted as the image (pictorial) feature in the above-described embodiment. Alternatively, even such invisible information such a fluorescence and dropouts may be extracted if this invisible information can specify amount sorts of bills and also individual bills. Moreover, as the physical feature, not only the thickness of the bills, but also conditions of these bills, for example, light transmission amounts which can specify the individual bills may be employed.

Alternatively, the memory unit 5 may be realized by employing a semiconductor memory, a magnetic storage apparatus, and the like, which are capable of storing therein the features extracted by the feature extracting unit 4. The memory capacitance of this memory unit 5 may be selected by the following conditions, namely, money deposited in one transaction (limitation in quantity by automatic cash transaction apparatus 9), or money deposited in plural transactions.

The first discriminating unit 6 discriminates the bills. A first circulatable bill storage unit 7 and a second circulatable bill storage unit 8 may store therein circulatable bills among normal bills which can be discriminated as "normal bill" by the first discriminating unit 6. The first circulatable bill storage unit 7 and the second circulatable bill storage unit 8 may store therein the circulatable bills in the last-in first-out (LIFO) manner. A temporary storing unit 9 temporarily stacks the uncirculatable bills among such normal bills which are discriminated as normal bill by the first discriminating unit 6.

At this time, the temporary storing unit 9 temporarily stores the bills into a storing convey path under such a condition that portions of these bills are overlapped with each other by way of a mechanism (will be explained later). An uncirculatable bill storage unit 10 stores therein the uncirculatable bills temporarily stacked in the temporary storing unit 9.

A second discriminating unit 11 discriminates the bills derived from the first circulatable bill storage unit 7 and the second circulatable bill storage unit 8. A reject box 12 stores therein such a bill which is discriminated as an "abnormal bill" by the second discriminating unit 11. A cassette 13 corresponds to such a cash box capable of loading the bills on this automatic cash transaction apparatus, and also capable of collecting the bills form this automatic cash transaction apparatus. It should be understood that the above-described respective structural elements are controlled by a control apparatus (not shown in detail).

Figure 2:
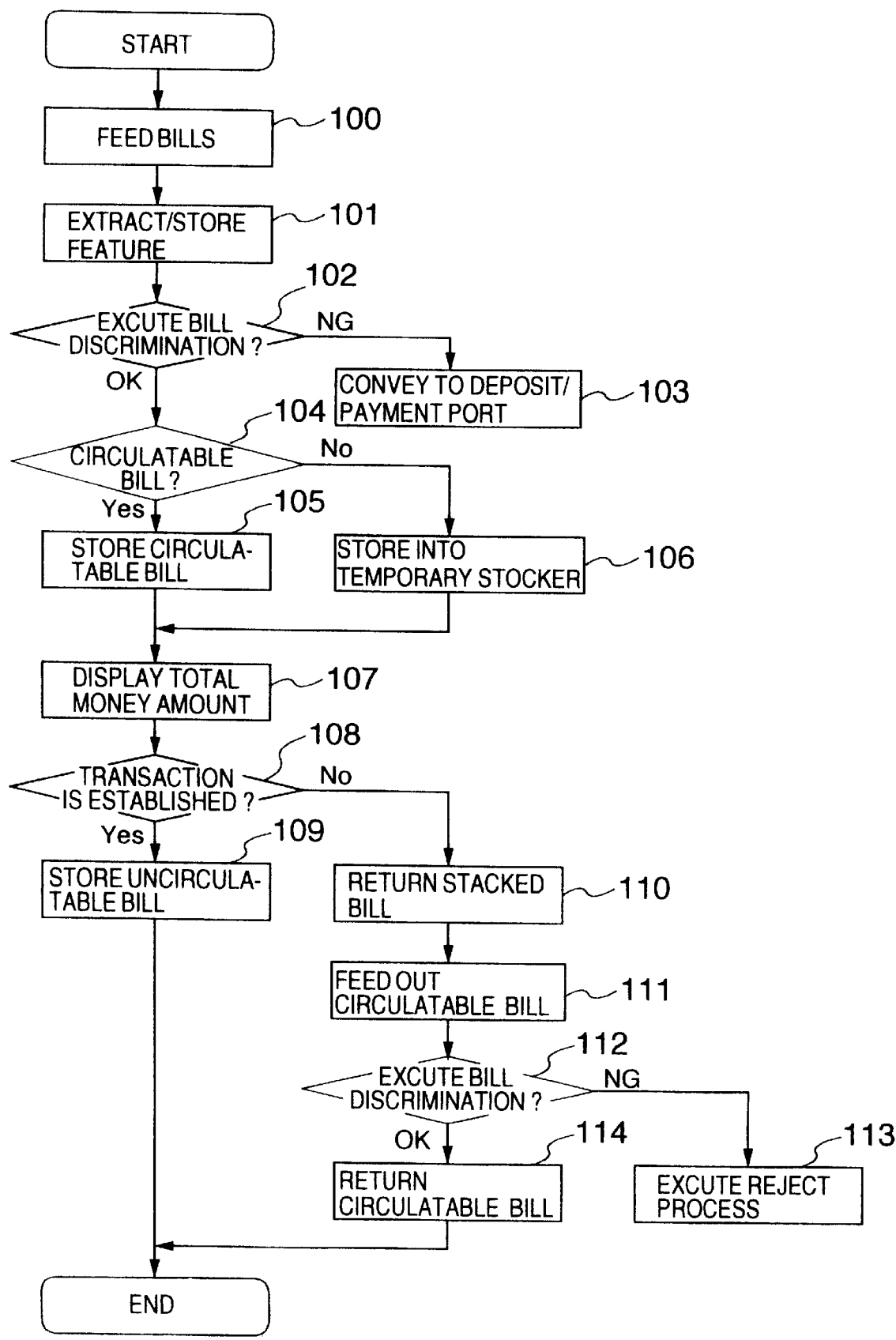
FIG. 2 is a diagram showing a process operation of the bill convey mechanism of the automatic cash transaction apparatus according to the present invention.

Operations of the bill convey mechanism with employment of the above-described arrangements, according to the embodiment of FIG. 1, will now be described with reference to a process flow operation shown in FIG. 2. When the customer enters the bills 3 into the deposit/payment port 2, the deposit/payment port 2 separates the the bills 3 and then feeds the separated bill 3 (step 100). When the bill 3 are conveyed on the convey path 1, the feature extracting unit 4 extracts the image features such as the pictorial patterns and the bill numbers with respect to each of the bills conveyed on the convey path 1, and the memory unit 5 stores therein the features extracted by the feature extracting unit 4 with respect to each of the bills (step 101).

Next, the first discriminating unit discriminates a bill (step 102). When the first discriminating unit judges that this bill corresponds to the abnormal bill, this abnormal bill is conveyed to the deposit/payment port 2 (step 103). Conversely, when the first discriminating unit 6 can judge that the bills correspond to the normal bills, the circulatable bills are stored into the first circulatable bill storage unit 7 and the second circulatable bill storage unit 8 in the last-in first-out method, which are determined depending upon the sorts of bills (step 105), whereas the uncirculatable bills are temporarily atacked in the temporary storing unit 9 (step 106). It should be understood that the above-described process operations defined from the step 100 to the step 106 are carried out as to all of the deposited bills.

When all of the deposited bills are processed, a total amount of the bills stored in the first circulatable bill storage unit 7 and the second circulatable bill storage unit 8, and of the bills temporarily stacked in the temporary storing unit 9 is displayed on a display unit (not shown in detail) of the automatic cash transaction apparatus (step 107). When the customer confirms the amount of money and then the transaction can be established (step 108), the bills temporarily stacked in the temporary storing unit 9 are stored into the uncirculated bill storage unit 10 (step 109).

When the customer cancels the transaction, the bills temporarily stacked into the temporary storing unit 9 are returned to the deposit/payment port 2 (step 110). Also, the circulatable bills are fed out from the first circulatable bill storage unit 7 and the second circulatable bill storage unit 8 (step 111), and then are discriminated by the second discriminating unit 11 (step 112). If the circulatable bill is judged as the abnormal bill by the second discriminating unit 11, then this abnormal bill is conveyed to the reject box 12 (step 113), and the normal bill is returned to the deposit/payment port 2 (step 114).

Figure 3:
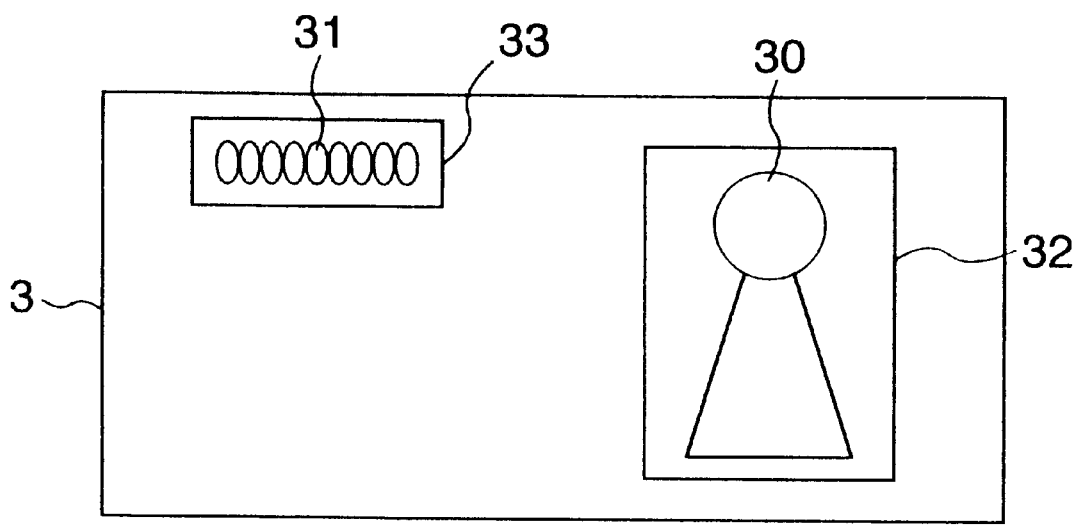
FIG. 3 is an illustration of a pictorial feature of a bill acquired/stored in the automatic cash transaction apparatus of the present invention.
Figure 4A:
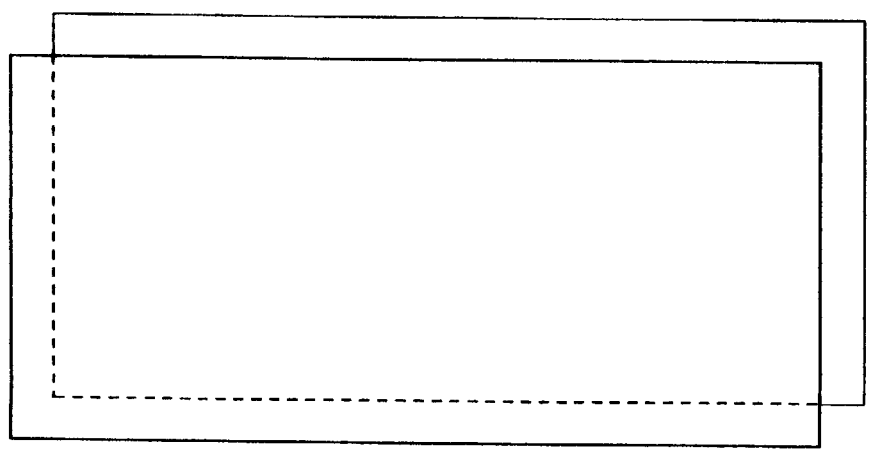
FIGS. 4A and 4B are an illustrations of a physical feature of a bill acquired/stored in the automatic cash transaction apparatus of the present invention.
Figure 4B:
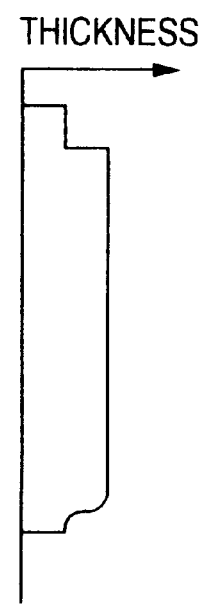

The image (pictorial) feature and the physical feature extracted by the above-described feature extracting unit 4 will now be summarized with reference to examples shown in FIG. 3 and FIGS. 4A and 4B. That is, FIG. 3 is an example for illustrating a feature appearing on an image of a bill. As a feature capable of specifying a sort of a money amount and individual bills, there are a pictorial pattern 30 such as a portrait and a bill number 31. In this case, binary images and variable-density images of a region 32 involving the pictorial pattern 30, and of another region 33 involving the bill number 31 are extracted as the feature.

FIGS. 4A and 4B represents an example indicative of a physical feature of bill. As the physical feature capable of specifying a condition of a bill, there is a thickness of the bill. While the thicknesses are extracted as the physical feature of the bills, such fact as whether one sheet of bill is present (as indicated in FIG. 4A), or a plurality of bills are overlapped with each other can be recognized based on the information about the thickness as indicated in FIG. 4B.

Next, a description will now be made of a trouble shooting operation in such a case that when the customer cancels the money deposit transaction, the total number/amount sort of the bills deposited by the customer are not coincident with those of the bills returned to the deposit/payment port. When the customer cancels the money deposit transaction, the uncirculatable bills themselves which have been deposited form the temporary storing unit 9 are directly returned. However, since the circulatable bills are derived from the first circulatable bill storage unit 7 and the second circulative bill storage unit 8, the returned bills are not directly equal to the deposited bills in the case that such an abnormal bill judged as the abnormal bill by the second discriminating unit 11 appears.

At this time, if the customer makes a proposal, then the staff member causes the storage content of the memory unit 5 to be displayed on the display apparatus (not shown). As a result, the staff member performs the identification and confirmation of the bills based upon the image features of the bills, and thus may return such bills which are actually deposited by the customer.

In this case, if the physical features such as the thicknesses and sizes of these bills are also stored in the memory unit 5, then the staff member may easily perform the identification and confirmation of the bills. Also, alternatively, when the thicknesses and sizes of the bills are sensed by employing an optical sensors and an optical image processing operation and also the thicknesses of the bills are sensed by sensing unit, the staff member can more easily explain such a trouble, while displaying these physical features in addition to the previously explained image feature. That is, the incoincident total number occurs in the returned bills, because a plurality of bills are overlapped with each other, and also the deposited bills are judge as the abnormal bills.

As explained above, since the image features and thickness features of the bills have been stored as the image information and this image information is represented to the customer, the staff member can readily explain the reason why such a trouble happens to occurs. That is, when the customer cancels the money deposit transaction, the number/amount sort of the bills deposited by the customer are not coincident with those of the bills returned to the deposit/payment port.

Figure 5:
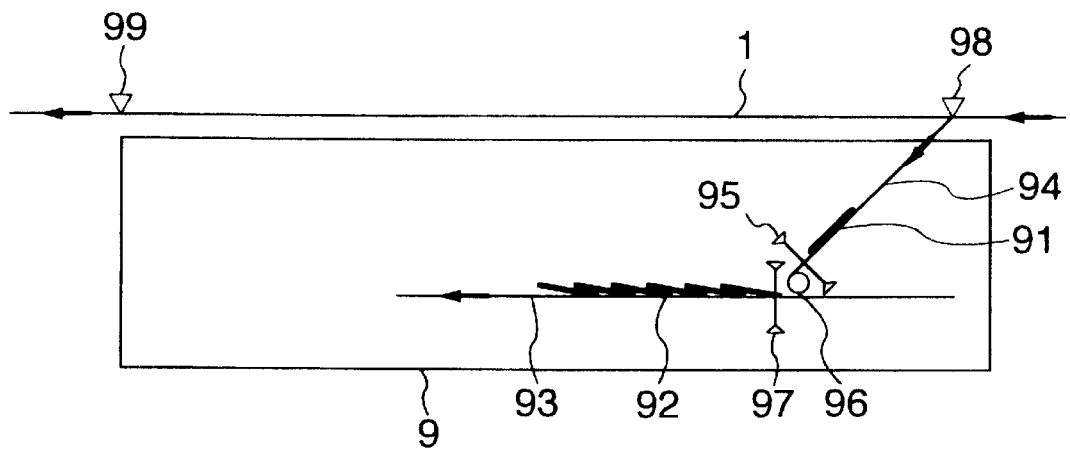
FIG. 5 is a schematic diagram showing a temporary storage unit employed in the automatic cash transaction apparatus of the present invention.

Subsequently, the temporary storage unit 9 for temporarily stacking the uncirculatable bills under such a condition that portions of these uncirculatable bills are overlapped, which may cause the paper jam, will now be explained with reference to FIG. 5.

The temporary storing unit 9 is constituted of a temporary storing convey path 93, an inducing convey path 94, a pass sensor 95, a roller 96, and a storage sensing sensor 97. The temporary storing convey path 93 temporarily stores uncirculatable bills 91 within a convey belt while setting these uncirculatable bills as a stacked bill group 92 under which portions of these uncirculatable bills are overlapped with each other. The inducing convey path 94 induces the uncirculatable bills 91 to the temporary storing convey path 93. The pass sensor 95 senses passing of the uncirculatable bills 91. The roller 96 transports the uncirculatable bills 91 from the inducing convey path 94 to the temporary storing convey path 93. The storage sensing sensor 97 senses the storage of the uncirculatable bills 91.

The convey direction of the uncirculatable bills 91 which have been conveyed over the convey path 1 along the arrow direction is switched by a gate 98, so that these uncirculatable bills 91 are induced to the inducing convey path 94. When the uncirculatable bills 91 which have been conveyed over the inducing convey path 94 along the arrow direction are detected by the pass sensor 95, the temporary storing convey path 93 is driven along the arrow direction at a speed lower than that of the inducing convey path 94, the uncirculatable bills 91 are released by the roller 96 from sandwiching by the inducing convey path 94, and then are sandwiched by the temporary storing convey path 93, so that the sandwiched uncirculatable bills are stored as the stacked bill group 92. When the uncirculatable bills 91 are sensed by the storage sensing sensor 97, the temporary storing convey path 93 is stopped.

Since this operation is repeatedly performed, the uncirculatable bills are stored under such a condition that portions of these uncirculatable bills are overlapped with each other. At this time, in the case that the temporary storing convey path 93 is driven, this temporary storing convey path 93 is firstly moved along a direction opposite to the arrow direction, and thereafter is moved along this arrow direction after a tip portion of the succeeding bill is separated from the inducing convey path 94 and is laid on a bill existing on the temporary storing convey path 93. As a consequence, the uncirculatable bills can be surely stored under such a condition that portions of these uncirculatable bills are overlapped with each other.

Also, after the bill has been moved on the temporary storing convey path 93, even if this temporary storing convey path 93 is previously driven along a direction opposite to the arrow direction and then waits for the next bill, the bills may be similarly stored under such a condition that portions of the bills are overlapped with each other.

After all of the uncirculatable bills have been stored, in order that the stacked bill group 92 is stored in the uncirculated bill storage unit 10, or returned to the deposit/payment port 2, the temporary storing convey path 93 is driven at the same speed as that of the convey path 1, and the stacked bill group 92 is conveyed over the temporary storing convey path 92 to be joined by a gate 99 onto the convey path 1. This gate 99 may switch the convey direction in such a manner that the stacked bill group which has been conveyed form the temporary storing convey path 93 and a portion of which is being overlapped with each other is conveyed along a left transverse-arrow direction, and then is stored into the uncirculatable bill storage unit 10, or is conveyed along an upper left-arrow direction so as to be returned to the deposit/payment sort 2.

With employment of such an arrangement, a total number of separating operations for the uncirculatable bills which may cause the paper jam can be reduced, and these uncirculatable bills can be temporarily stored within saving the storage space. Also, since the uncirculatable bills are conveyed while keeping such a condition that portions of these uncirculatable bills are overlapped with each other, there is a small possibility that such uncirculatable bills having different sizes are jammed. As a consequence, the present inventive idea may also be applied to automatic cash transaction apparatus capable of handling foreign bills.

Also, since such a simple convey path can be formed, there are such merits that the automatic cash transaction apparatus can be made compact and in low cost.

Further, since the circulatable bills among the deposited bills are stored in the circulatable bill storage units depending upon the amount sorts thereof, and also the uncirculatable bills among these deposited bills, the customers can receive the deposited bills in such a separation manner that the amount sorts of the circulatable bills are discriminated in combination with the uncirculatable bills when the customers cancel the deposit transaction.

For example, bills of 1,000 yen are stored into the first circulatable bill storage unit 7, bills of 10,000 yen are stored into the second circulatable bill storage unit 8, and bills of 5,000 yen and also other bills of 1,000 yen and 10,000 yen are stored into the temporary storing unit 9. The bills of 1,000 yen and 10,000 yen stored in the temporary storing unit 9 cannot be used for the payment due to heavy damaged conditions. Then, when the customer cancels the deposit transaction, these bills are separately conveyed from the respective storage destinations to the deposit/payment port 2, so that the bills of 1,000 yen, 10,000 yen and 5,000 yen, and further the bills of 1,000 yen and 10,000 yen which are not used for the payment can be returned to the deposit/payment port 2 in an arbitrary order. As described above, since the bills can be returned with respect of the amount sorts thereof irrelevant to the deposit order thereof, the customer can easily confirm the bills.

As previously described, this embodiment is directed to such an automatic cash transaction apparatus equipped with both the feature extracting unit/memory means capable of extracting/storing the image feature and the like of the deposited bills, and the temporary storing unit 9 for temporarily stacking the bills under condition that portions of these bills are overlapped with each other. Alternatively, even when only the feature extracting unit 4 and the memory unit 5 are employed in the automatic cash transaction apparatus, it is possible to solve such a customer's complaint that the total number and the amount sorts of the deposited bills are not coincident with those of the returned bills when the customer cancels the deposit transaction. Furthermore, even when only the temporary storing unit 9 is employed in the automatic cash transaction apparatus, it is possible to solve a problem such as a paper jam caused by the uncirculatable bills. As apparent from the foregoing description, there is no practical problem even when the automatic cash transaction apparatus is equipped with only one of the above-described arrangements.

In the above-described embodiment, the last-in first-out (LIFO) type circulatable bill storage units are employed in the automatic cash transaction apparatus in order that the same bills as the deposited bills can be returned to the customer who cancels the deposit transaction. Alternatively, a first-in first-out (FIFO) type bill storage unit may be employed if the above-described temporary storing unit is employed as the paper-jam trouble preventing unit in such a transaction apparatus capable of mainly transacting bills having different sizes, for instance, Japanese bills in combination with foreign bills.

Also, the above-described automatic cash transaction apparatus employs the uncirculatable bill storage unit as such an uncirculatable type storage unit without having the feeding function. Alternatively, when the mechanism as explained in FIG. 5 is used so that the bill can be fed out from a storage unit under such a condition that portions of these bills are overlapped with each other, this uncirculatable type storage unit may be replaced by a last-in first-out, or first-in first-out type circulatable mode storage unit similar to the circulatable paper storage unit. In this alternative case, the uncirculatable bills may be readily collected by using the cassette 13.

Further, even when such uncirculatable bills as bills of 5,000 yen which are determined not to be used for the payment are stored in the uncirculatable bill storage unit, a circulatable type storage unit may be employed instead of this uncirculatable type storage unit. Then, in this embodiment, two sets of circulatable bill storage units are employed. When these are more than three sorts of circulatable bills, a plurality of circulatable bill storage units may be employed so as to be fitted to a total number of amount sorts.

Also, the feature extracting init 4 is arranged on the up stream side of the discriminating unit in this automatic cash transaction apparatus. However, the present invention is not limited to this setting position, but the feature extracting unit 4 may be alternatively arranged at any positions where the features of the deposited bills can be extracted. Moreover, the uncirculatable bill storage unit 10 is arranged just beside the circulatable bill storage unit 7. However, the present invention is not limited to this location, but this uncirculatable bill storage unit 10 may be set at any positions where the stacked bills can be stored in the temporary storing unit 9. In addition, the temporary storing means 9 may be arranged at any places where the discriminated uncirculatable bills can be temporarily stacked.

Figure 6:
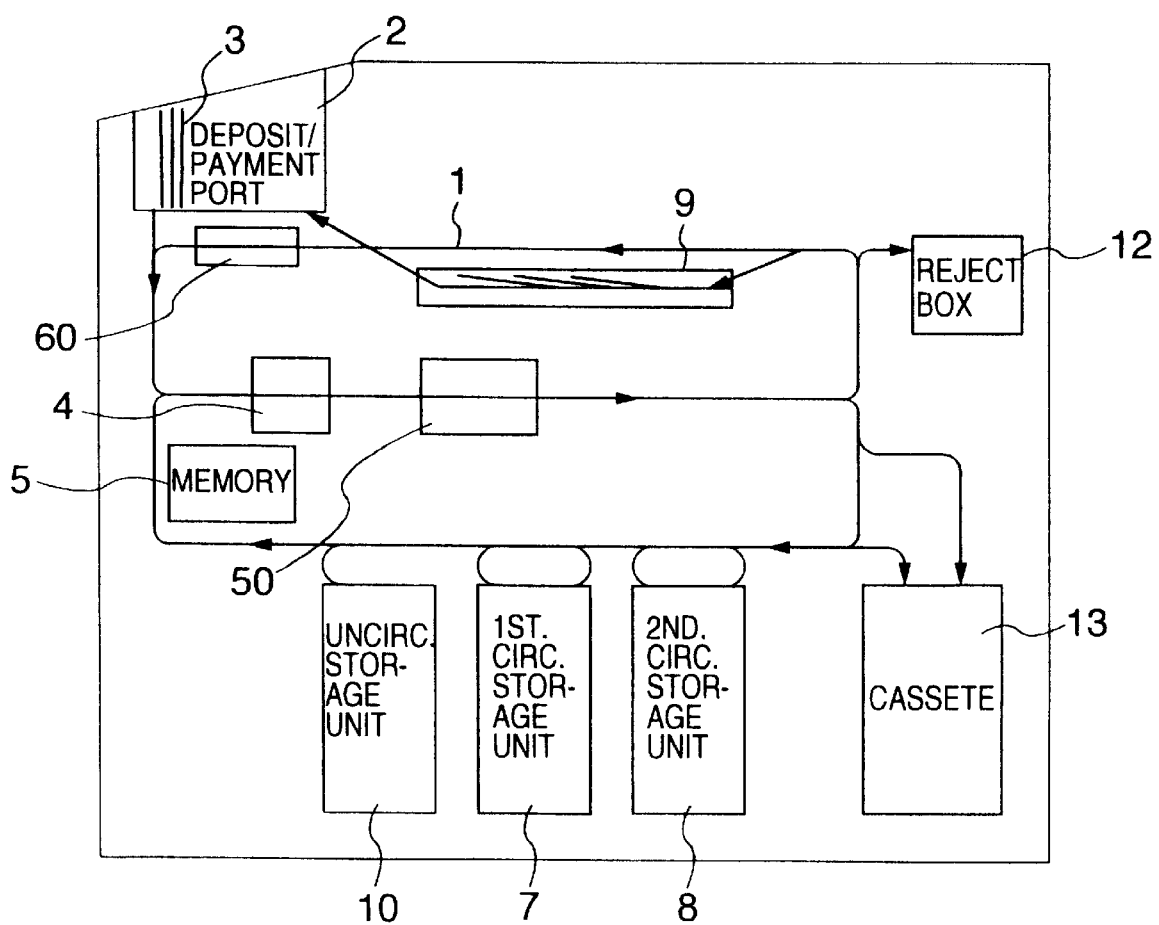
FIG. 6 is a schematic diagram showing a bill convey mechanism of an automatic cash transaction apparatus according to another embodiment of the present invention.

Next, another automatic cash transaction apparatus according to another embodiment of the present invention will now be described. FIG. 6 is a schematic diagram for representing a bill convey mechanism of the automatic cash transaction apparatus according to another embodiment of the present invention. It should be noted in FIG. 6 that since the same reference numbers shown in FIG. 1 indicate the structural elements having the same functions, no further explanations thereof are made. A third discriminating imit 50 discriminates the bills deposited from the deposit/payment port 2, and the bills fed out from the first circulatable bill storage unit 7 and the second circulatable bill storage unit 8. An operation of the bill convey mechanism with employment of the above-explained arrangement shown in FIG. 6 during deposit transactions is identical to that of the above-explained bill convey mechanism represented in FIG. 1 except that both the discriminating process operations defined at the step 102 and the step 112 are carried out by the third discriminating unit 50.

In accordance with this embodiment, since only single discriminating unit 50 is employed, the same discriminating results can be continuously obtained. As a consequence, when the bills are discriminated as the "normal bills" during the money deposit and then the bills stored in the storage units are fed out so as to be again discriminated, there is small possibility that these bills stored in the storage units are discriminated as the "abnormal bills" to be conveyed to the reject box 12.

Next, operations of this bill convey mechanism during payment will now be explained. During payment, the temporary storing unit 9 is used in order to again discriminate such a rejected bill which has been discriminated as the abnormal bill by the third discriminating unit 50. In order that an attitude of a bill (namely, inclination of bill with respect of convey direction thereof, and movement along transverse direction) can be corrected before again executing the discriminating operation by the third discriminating unit 50, an attitude correcting unit 60 is provided between the temporary storing unit 9 and the third discriminating unit 50 in this embodiment.

Figure 7:
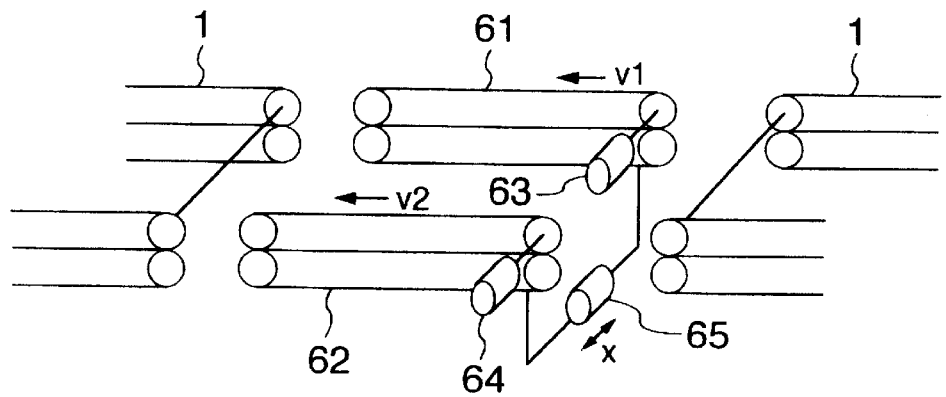
FIG. 7 schematically illustrates a structure of an attitude correcting unit employed in the automatic cash transaction apparatus of FIG. 6.

FIG. 7 schematically illustrates a detailed structure of this attitude correcting units 60.

The attitude correcting unit 60 is arranged by two sets of convey paths 61 and 62 which are independently driven. The convey path 61 is driven by a drive unit 63, and the convey path 62 is driven by another drive means 64. The convey path 61 is coupled with the convey path 2 by a parallel moving unit 65. A bill is conveyed from the convey path 1, an inclination of the bill with respect of the convey direction of bill is corrected based on a difference between a convey speed "v1" of the convey path 61 and another convey speed "v2" of the convey path 62, and a transverse-direction movement of the bill with respect to the convey direction of this bill is corrected based on a movement amount "x" of the parallel moving unit 65. The bill, the attitude of which has been corrected by the attitude correcting unit 60, is again fed to the convey path 1. It should be understood that the arrangement of this attitude correcting unit 60 is not limited thereto, but any other arrangements may be employed by which the attitude of the bill can be corrected.

Figure 8:
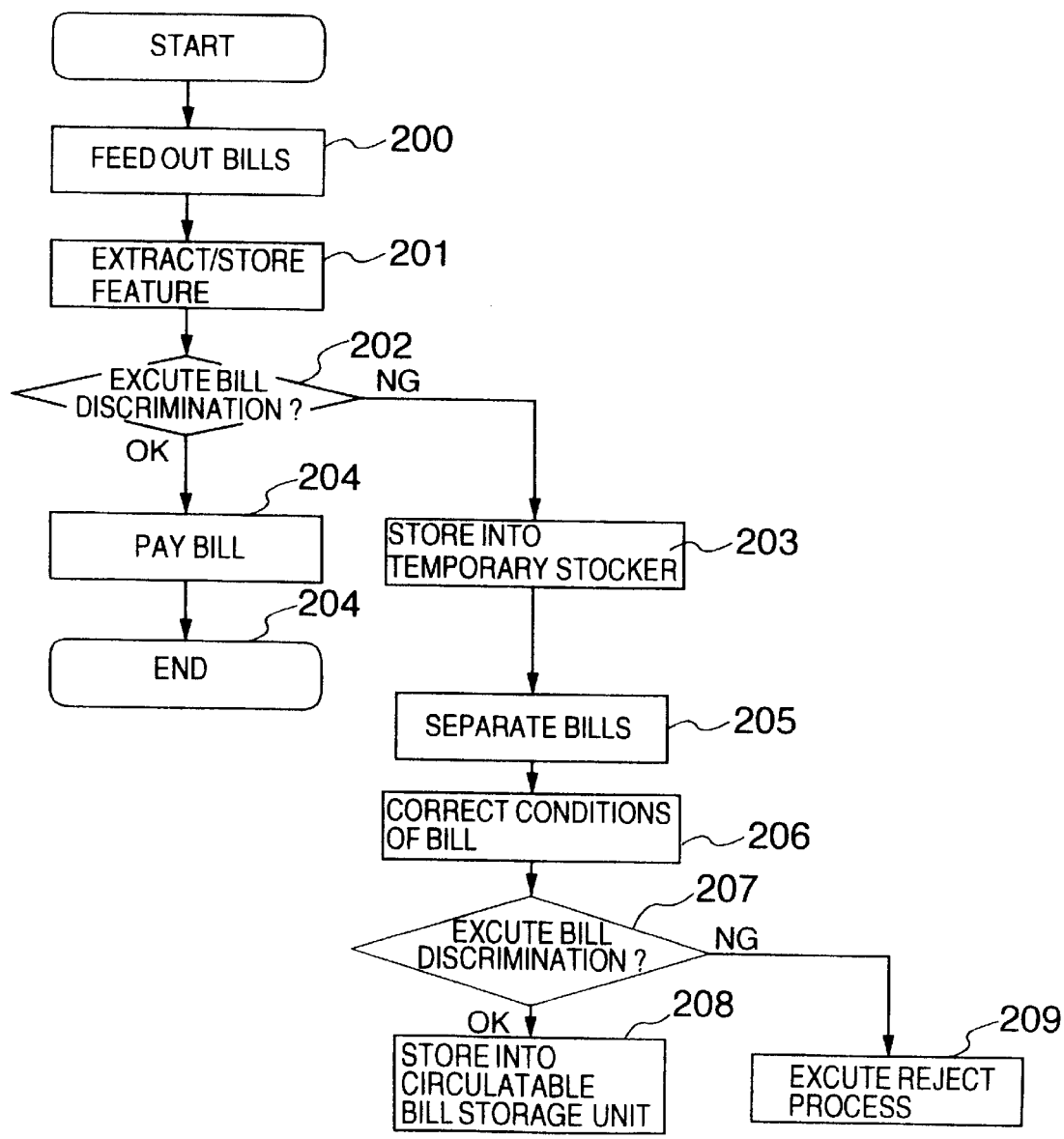
FIG. 8 is a flow chart describing a process operation of a bill convey mechanism employed in the automatic cash transaction apparatus of FIG. 6.

FIG. 8 indicates process flow operation of the bill convey mechanism during payment.

In this flow chart, when a customer requests to pay money, either the first circulatable bill storage unit 7 or the second circulatable bill storage unit 8 separates the bills and then feeds out the separated bills to the convey path 1 (step 200). While the bills are conveyed over the convey path 1, the feature extracting unit 4 extracts image features such as pictorial patterns and bill numbers of the bills conveyed over the convey path 1 with respect of each of the bills, and the memory unit 5 stores therein the features extracted by the feature extracting unit 4 with respect to each of the bills (step 201).

Next, the third discriminating unit 50 discriminates the bills (step 202). When the third discriminating unit 50 judges the bills as the abnormal bills, the abnormal bills are conveyed to the temporary storing unit 9 (step 203). Conversely, when the third discriminating unit 50 discriminates the bills as the normal bills, the normal bills are paid from the deposit/payment port 2 (step 204), so that this process operation is completed.

When the payment process is ended, the bills temporarily stacked in the temporary storing unit 9 are again separated and then the separated bills are conveyed (step 205). At this time, these bills are separated one by one by setting the convey speed of time temporary storing unit 9 slower than the convey speed of the convey path 1. The shifts and skews of the bills are corrected by the attitude correcting unit 60 (step 206), and thereafter the attitude-corrected bills are again discriminated by the third discriminating unit 50 (step 207).

The normal bills are stored in either the first circulatable bill storage unit 7, or the second circulatable bill storage unit 8 (step 208), whereas the total quantity (amounts) of the abnormal bills are defined based on the data acquired by the feature extracting unit 4, and thereafter these abnormal bills are conveyed to the reject box 12 (step 210).

In accordance with this embodiment, since the attitudes of the rejected bills are corrected and thereafter these corrected bills can be again discriminated by the feature extracting unit 4 and the discriminating unit 50, the ratio of the normal bills to the abnormal bills during the payment can be increased. Also, since the bills are conveyed from the specific circulatable bill storage unit during the payment, the amounts of these conveyed circulatable bills are recognized. If a total number of these circulatable bills is recognized by the feature extracting unit 4, then the amounts of the rejected bills can be defined and thus can be stored into the reject box 12. As a consequence, the cash stored in the automatic cash transaction apparatus can be correctly managed.

It should also be noted that when the bills are judged as the abnormal bills, a total quantity of the abnormal bills may be defined based upon the data stored in the feature extracting unit 4 and the storage means 5, and a total number of rejected bills may be defined (namely, total amount thereof is defined) without being stored into the temporary storing unit 9 and then these rejected bills may be stored in the rejected box 12.

Also, the apparatus according to this embodiment may be realized even in such an automatic cash dispensing machine capable of performing only payment operations.

As previously described in detail, according to the present invention, since the features of the bills are extracted and stored when the bills are deposited, such a customer's complaint can be readily solved, namely the total number/amount sorts of the deposited bills are not coincident with those of the returned bills when the customer cancels the money deposit or the transaction. Furthermore, since the circulatable bills among the deposited bills are stored into the storage unit immediately after the discriminating process operations, the money deposit process operation can be executed in high speeds. Moreover, the bills having the uncertain sizes involving the uncirculatable bills are separated only during the money deposit, so that in particular, such bills having largely different sizes with respect of each of their amounts can be handled in high reliability.

Also, since the uncirculatable bills are temporarily stacked under such a condition that portions of these uncirculatable bills are overlapped with each other, the bills can be surely returned to the customer when the customer cancels the money deposit, and when the transaction can be accomplished, the uncirculatable bills can be firmly conveyed to the uncirculatable paper storage unit. As a consequence, it is possible to reduce the paper jam occurred while the uncirculatable bills are conveyed.

Moreover, the total quantity and/or the total amount of the abnormal bills are defined during the payment, and then these abnormal bills can be stored in the abnormal bill storage unit (reject box). Accordingly, the cash stored in this automatic cash transaction apparatus can be correctly managed. Furthermore, since the abnormal bills are again discriminated, the discriminating rate can be improved.

What is claimed is:

1. An automatic cash transaction apparatus including a deposit/payment port of depositing/paying bills; a circulatable bill storage unit for storing therein circulatable bill storage unit for storing therein circulatable bills used to be paid among said deposited bills; an uncirculatable bill storage unit for storing therein uncirculatable bills not used to be paid; and a convey path for conveying bills among said deposit/payment port, said circulatable bill storage unit, and said uncirculatable bill storage unit;

said automatic cash transaction apparatus comprising:

feature extracting means provided on said convey path for extracting a pictorial pattern of the respective bills deposited via said deposit/payment port, said pictorial patterns for identifying and confirming on display; and memory means for storing therein the features extracted by said feature extracting means with respect to each of said deposited bills.

2. An automatic cash transaction apparatus as claimed in claim 1 wherein:

said feature extracting means is an image acquiring apparatus.

3. An automatic cash transaction apparatus as claimed in claim 2 wherein:

images of all of said deposited bills are stored in said memory means.

4. An automatic cash transaction apparatus as claimed in claim 2 wherein:

at least one of images of the circulatable bills, the uncirculatable bills, and absolute bills, which are discriminated by a discriminating means from said deposited bills, is stored into said memory means.

5. An automatic cash transaction apparatus as claimed in claim 1 wherein:

sensing means for sensing a thickness of said deposited bill is equipped with said feature extracting means.

6. An automatic cash transaction including a deposit/payment port of depositing/paying bills; a circulatable bill storage unit for storing therein circulatable bill storage unit for storing therein circulatable bills used to be paid among said deposited bills; an uncirculatable bill storage unit for storing therein uncirculatable bills not used to be paid; and a convey path for conveying bills among said deposit/payment port, said circulatable bill storage unit, and said uncirculatable bill storage unit;

said automatic cash transaction apparatus comprising:

feature extracting means provided on said convey path for extracting a pictorial pattern of the respective bills deposited via said deposit/payment port:

memory means for storing therein the features extracted by said feature extracting means with respect to each of said deposited bills; and temporary storing means for temporarily stacking only the uncirculatable bills among said deposited bills.

7. An automatic cash transaction apparatus as claimed in claim 6 wherein:

said temporary storing means stores therein the bills within the convey path under such a condition that portions of the bills are overlapped with each other.

8. An automatic cash transaction apparatus as claimed in claim 6 further comprising:

a convey path for directly connecting said temporary storing means with said deposit/payment port.

9. An automatic cash transaction including a deposit/payment port of depositing/paying bills; a circulatable bill storage unit for storing therein circulatable bill storage unit for storing therein circulatable bills used to be paid among said deposited bills; an uncirculatable bill storage unit for storing therein uncirculatable bills not used to be paid; and a convey path for conveying bills among said deposit/payment port, said circulatable bill storage unit, and said uncirculatable bill storage unit;

said automatic cash transaction apparatus comprising:

feature extracting means provided on said convey path for extracting a pictorial pattern of the respective bills deposited via said deposit/payment port;

memory means for storing therein the features extracted by said feature extracting means with respect to each of said deposited bills;

an inducing convey path for inducing the uncirculated bills and either normal bills or the abnormal bills;

sensing means for sensing passing of the bills conveyed by said inducing convey path; and a temporary storing convey path connected to said inducing convey path;

wherein said temporary storing convey path is driven only when said sensing means senses passing of said bills, while storing said bills.

10. An automatic cash transaction apparatus comprising: a deposit/payment port for depositing/paying bills; a storage unit for storing said deposited bills; and a convey path for conveying the bills between said deposit/payment port and said storage unit, wherein:

when a deposit transaction is canceled by a user, said deposited bills are returned to said deposit/payment port with the deposited bills distinguished as to the bills and/or circulable bills and uncirculable bills.

11. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

means for defining a total number or a total amount of the bills which are judged as abnormal bills by said discriminating means.

12. An automatic cash transaction apparatus as claimed in claim 11 wherein:

said defining means is an image acquiring apparatus.

13. An automatic cash transaction apparatus as claimed in claim 11 wherein:

said defining means is a thickness sensing means.

14. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

storing means for stacking bills which are judged as abnormal bills; wherein:

the bills stacked in said storing means are again discriminated by said discriminating means.

15. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

storing means for stacking bills which are judged as abnormal bills, wherein, the bills stacked in said storing means are again discriminated by said discriminating means;

wherein said storage means stacks said bills under such a condition that portions of said bills are overlapped with each other, and again separates the stacked bills, and thereafter the separated bills are again discriminated by said discriminating means.

16. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

storing means for stacking bills which are judged as abnormal bills, wherein, the bills stacked in said storing means are again discriminated by said discriminating means; and a correction mechanism for correcting an incline of a bill and/or a transverse-direction movement thereof with respect to the convey direction;

wherein after the attitude of said bill is corrected by said correction mechanism, the attitude-corrected bill is again discriminated by said discriminating means.

17. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

storing means for stacking bills which are judged as abnormal bills, wherein, the bills stacked in said storing means are again discriminated by said discriminating means;

an inducing convey path for inducing only said abnormal bills; and sensing means for sensing passing of the bills conveyed by said inducing convey path;

wherein said temporary storing convey path is driven only when said sensing means senses passing of said bills, while storing said bills.

18. An automatic cash transaction apparatus including: a storage unit for storing therein bills; discriminating means for discriminating the bills; a payment port for paying the bills; and a convey path for conveying the bills among said storage unit, said discriminating means, and said payment port, said automatic cash transaction apparatus comprising:

storing means for stacking bills which are judged as abnormal bills, wherein, the bills stacked in said storing means are again discriminated by said discriminating means; and means for defining a total number and/or a total amount of bills which are again discriminated by said discriminating mans to be again judged as abnormal bills.

19. An automatic cash transaction apparatus as claimed in claim 18 wherein:

said defining means is an image acquiring apparatus.

20. An automatic cash transaction apparatus as claimed in claim 18 wherein:

said defining means is a thickness sensing means.

* * * * *